(12) United States Patent
Kondo

(10) Patent No.: US 11,574,260 B2
(45) Date of Patent: Feb. 7, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Satoshi Kondo, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 154 days.

(21) Appl. No.: 17/122,212

(22) Filed: Dec. 15, 2020

(65) Prior Publication Data
US 2021/0398037 A1  Dec. 23, 2021

(30) Foreign Application Priority Data
Jun. 22, 2020 (JP) .............................. JP2020-106992

(51) Int. Cl.
G06Q 10/00 (2012.01)
G06Q 10/06 (2012.01)
H04W 4/02 (2018.01)
G06Q 10/10 (2012.01)
H04L 67/52 (2022.01)

(52) U.S. Cl.
CPC .............. *G06Q 10/06* (2013.01); *G06Q 10/10* (2013.01); *H04L 67/52* (2022.05); *H04W 4/02* (2013.01)

(58) Field of Classification Search
CPC ........ G06Q 10/06; G06Q 10/10; H04L 67/52; H04W 4/02
USPC ........................................ 705/7, 270
See application file for complete search history.

(56) References Cited

U.S. PATENT DOCUMENTS

| 7,103,835 | B1* | 9/2006 | Yankovich | ............ | G06F 40/174 |
| | | | | | 715/234 |
| 2013/0167020 | A1* | 6/2013 | Farmer | .................. | G06Q 10/06 |
| | | | | | 715/255 |
| 2013/0254699 | A1* | 9/2013 | Bashir | .................... | G06Q 10/10 |
| | | | | | 715/772 |
| 2018/0239959 | A1* | 8/2018 | Bui | ...................... | G06Q 10/103 |

FOREIGN PATENT DOCUMENTS

JP          2010-140231 A          6/2010

* cited by examiner

*Primary Examiner* — Imad Hussain
(74) *Attorney, Agent, or Firm* — Oliff PLC

(57) ABSTRACT

An information processing apparatus includes a processor configured to: acquire a document; determine a route on which the document is to be processed in a workflow; determine a first process that is a final process for processing the document on the route among processes in which information is allowed to be input for a first item included in the document; and display the first item in a manner in accordance with the first process.

13 Claims, 13 Drawing Sheets

FIG. 5

| W21 | | | | |
|---|---|---|---|---|
| PROCESS ID | PROCESS NAME | START CONDITION | EXPRESSION INFORMATION | IMAGE DATA | CHARGE CONDITION |
| P31 | REGISTER JOB | (RECEIVE INQUIRY EMAIL) | GREEN | ⋮ | ⋮ |
| P32 | CREATE PRODUCT NAME LIST | P31 COMPLETED | ⋮ | ⋮ | ⋮ |
| P33 | ESTIMATE PART | P32 COMPLETED | ⋮ | ⋮ | ⋮ |
| P34 | REQUEST ESTIMATE SHEET | P33 COMPLETED | ⋮ | ⋮ | ⋮ |
| P35 | FORWARD | P34 COMPLETED | ⋮ | ⋮ | ⋮ |
| P36 | APPROVE | P35 COMPLETED & C61 SATISFIED | ⋮ | ⋮ | ⋮ |
| P37 | APPROVE | P36 COMPLETED | ⋮ | ⋮ | ⋮ |
| P38 | APPROVE | P35 COMPLETED & C61 UNSATISFIED | ⋮ | ⋮ | ⋮ |
| P39 | APPROVE | P38 COMPLETED | ⋮ | ⋮ | ⋮ |
| PE | END | P37 COMPLETED | P39 COMPLETED | ⋮ | ⋮ | ⋮ |

| D41 | | | 1233 |
|---|---|---|---|
| ITEM ID | ITEM NAME | INPUT-ALLOWED PROCESS ID | REQUEST PROCESS ID |
| I51 | ADDRESSEE | P31,P32,P33,P34 | P35 |
| I52 | ESTIMATE NUMBER | P34 | P35,P36,P37,P38,P39 |
| I53 | ESTIMATED TOTAL PRICE | P34,P33,P34 | P35 |
| I54 | PART UNIT PRICE | P31,P32 | P36,P37 |
| ... | ... | ... | ... |

FIG. 9

| CONDITION ID | CONDITION DATA | 124 |
|---|---|---|
| C61 | I53··· | |
| C62 | I53···I54··· | |
| ... | ... | |

| J211 | | |
|---|---|---|
| PROCESS ID | PERSON-IN-CHARGE ID | PROCESSING DATE AND TIME |
| P31 | U11 | 6/1 12:13 |
| P32 | U12 | ... |
| ... | ... | ... |

1253

| J211 | |
|---|---|
| DOCUMENT ID | DOCUMENT DATA |
| D41 | I51="···",I52=··· |
| D42 | ··· |
| ··· | ··· |

1254

The following processes do not use information to be input in the input field of part unit price, and necessity setting is reset.

OK  ~B4 # INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-106992 filed Jun. 22, 2020.

BACKGROUND

(i) Technical Field

The present disclosure relates to an information processing apparatus and a non-transitory computer readable medium.

(ii) Related Art

In a case where plural persons in charge separately input information for items in a document to be processed in a workflow, if a person to input information for each item is fixed in advance, flexible response is not possible. Thus, the following technique has been considered. In a case where a person submits, to an approver, a document including a blank item although information for the item needs to be input for approval, the person is given a warning. For example, Japanese Unexamined Patent Application Publication No. 2010-140231 discloses a workflow server that permits delay for inputting information an item until the time it is necessary to input information for the item, in order to increase throughput of the entire business.

SUMMARY

In the related art, plural users who separately input items in a document are unable to grasp a process until which it is necessary to input information for an item included in the document unless they are given a warning, which may result in confusion.

Aspects of non-limiting embodiments of the present disclosure relate to allowing a user to grasp a process in a workflow in which information may be input for each item included in a document to be processed in the workflow.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire a document; determine a route on which the document is to be processed in a workflow; determine a first process that is a final process for processing the document on the route among processes in which information is allowed to be input for a first item included in the document; and display the first item in a manner in accordance with the first process.

BRIEF DESCRIPTION OF THE DRAWINGS

An exemplary embodiment of the present disclosure will be described in detail based on the following figures, wherein:

FIG. 5 illustrates an example of a route table;

FIG. 8 illustrates an example of an item table;

FIG. 9 illustrates an example of a condition DB;

DETAILED DESCRIPTION

Exemplary Embodiment

Configuration of Information Processing System

Figure 1:
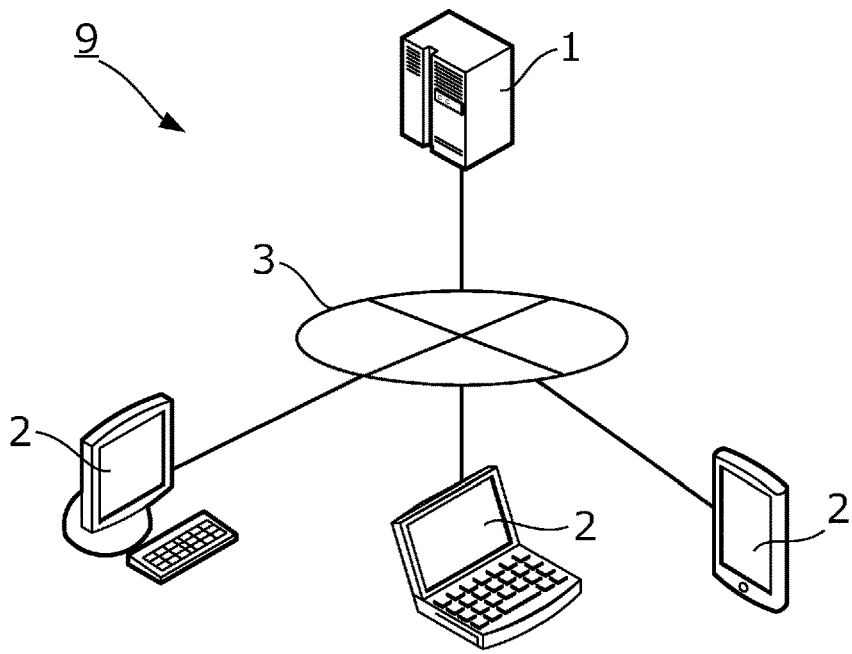
FIG. 1 illustrates an example of an overall configuration of an information processing system.

FIG. 1 illustrates an example of an overall configuration of an information processing system 9. The information processing system 9 illustrated in FIG. 1 is a system that monitors user operations and manages documents to be used by users in workflows. The workflow herein is a flow of business in which a series of predetermined processes are performed in accordance with a predetermined route. The workflow includes plural processes for processing a document. These processes are each a standardized repeatable pattern and are, for example, a group of processes of business allocated for a person in charge, a role, or a meaning. The route in the workflow is an order for performing the series of processes included in the workflow. As illustrated in FIG. 1, the information processing system 9 includes an information processing apparatus 1, terminals 2, and a communication line 3.

The information processing apparatus 1 is an apparatus that manages the workflow and helps a user to input information for each item included in a document to be processed in the workflow. For example, the information processing apparatus 1 is a computer.

The terminals 2 are terminal apparatuses operated by respective users of the information processing system 9 and are, for example, a smartphone, a personal computer, and the like. The terminals 2 may also be apparatuses that accept a user operation and perform processing related to an image, such as an image forming apparatus, an image reading apparatus, a facsimile, and a copier.

The communication line 3 is a line that communicably connects the information processing apparatus 1 and the terminals 2. The communication line 3 may be, for example, a local area network (LAN), a wide area network (WAN), the Internet, or a combination thereof. In addition, the communication line 3 may also include a public switched telephone network (PSTN), an integrated services digital network (ISDN), or the like.

Note that the numbers of information processing apparatuses 1, terminals 2, and communication lines 3, in the information processing system 9 are not limited to those illustrated in FIG. 1. For example, the information processing apparatus 1 may be configured by a cluster system in which functions are shared by plural apparatuses.

Configuration of Information Processing Apparatus

Figure 2:
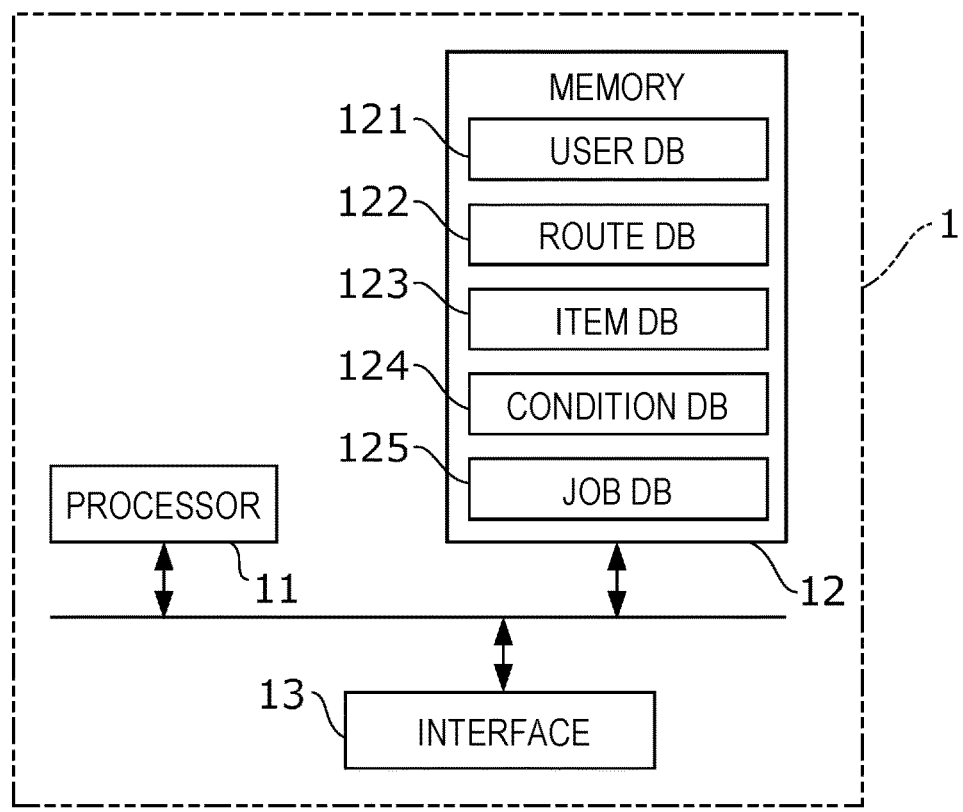
FIG. 2 illustrates an example of the configuration of an information processing apparatus.

FIG. 2 illustrates an example of the configuration of the information processing apparatus 1. The information processing apparatus 1 illustrated in FIG. 2 includes a processor 11, a memory 12, and an interface 13. That is, the information processing apparatus 1 is an example of an information processing apparatus including a memory and a processor. These components are communicably connected by a bus, for example.

The processor 11 reads and executes a program stored in the memory 12 to control the units of the information processing apparatus 1. The processor 11 is, for example, a central processing unit (CPU).

The interface 13 is a communication line that communicably connects the information processing apparatus 1 to the terminals 2 via the communication line 3 with or without wires.

The memory 12 is a storage that stores an operating system, various programs, data, and the like to be read in the processor 11. The memory 12 includes a random access memory (RAM) or a read only memory (ROM). Note that the memory 12 may further include a solid state drive, a hard disk drive, or the like. In addition, the memory 12 stores a user database (DB) 121, a route DB 122, an item DB 123, a condition DB 124, and a job DB 125.

Figure 3:
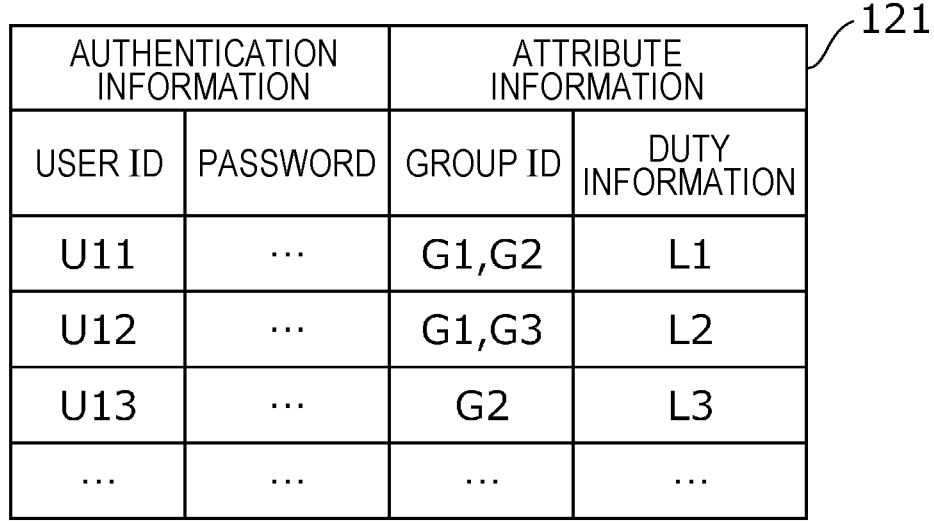
FIG. 3 illustrates an example of a user database (DB)

FIG. 3 illustrates an example of the user DB 121. The user DB 121 illustrated in FIG. 3 is a database that stores authentication information to be used for authentication of a user of the information processing system 9 and attribute information indicating the user's attribute.

In the user DB 121 illustrated in FIG. 3, the authentication information is a set of a user ID and a password. The user ID is identification information for identifying each user of the information processing system 9. The password is a character string or the like that the user identified by the corresponding user ID knows. In the user DB 121 illustrated in FIG. 3, the attribute information includes a group ID and duty information. The group ID is identification information for identifying a group such as a post or a project of the user identified by the corresponding user ID. Plural group IDs may be written in the group ID field. The duty information is information defining the duty range, authentication, or the like of the user identified by the corresponding user ID.

Figure 4:
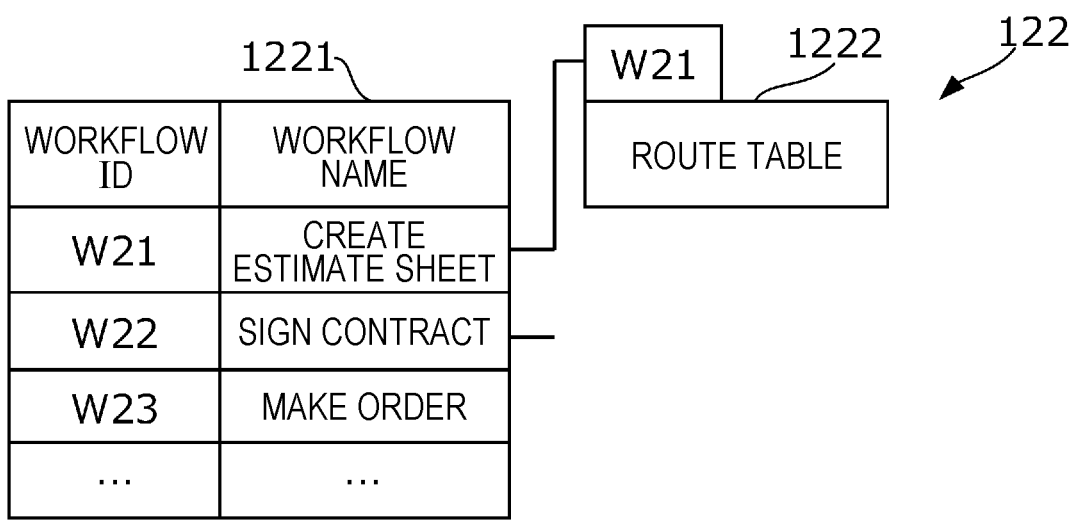
FIG. 4 illustrates an example of a route DB.

FIG. 4 illustrates an example of the route DB 122. The route DB 122 is a database that stores processes included in each workflow managed by the information processing system 9 and routes on which a document is to be processed in the processes. The route DB 122 illustrated in FIG. 4 includes a workflow table 1221 and route tables 1222.

The workflow table 1221 is a table that stores workflow IDs, which are identification information for identifying the respective workflows, and workflow names, which are names of the workflows, in association with each other. For example, in the workflow table 1221 illustrated in FIG. 4, the name of the workflow identified by the workflow ID "W21" is the workflow name "create estimate sheet".

In the workflow table 1221, each of the listed workflow IDs is associated with a corresponding one of the route tables 1222 in a one-to-one relationship. FIG. 5 illustrates an example of the route table 1222. The route table 1222 is a table that stores information on each of two or more processes included in a workflow identified by the associated workflow ID. The route table 1222 illustrated in FIG. 5 illustrates details of the route table 1222 illustrated in FIG. 4 and is associated with the workflow ID "W21". The route table 1222 stores items such as a process ID, a process name, a start condition, expression information, image data, and charge condition, in association with one another.

In the route table 1222, the process ID is identification information for identifying each of two or more processes included in the workflow identified by the associated workflow ID.

The process name is the name of the process. The start condition is information defining the condition for starting the process. For example, the process with the process ID "P31" in the route table 1222 illustrated in FIG. 5 is started in response to acceptance of an inquiry e-mail. In addition, in the route table 1222, the start condition associated with the process ID "P32" is "P31 completed". This means that the process identified by the process ID "P32" is started on the condition that the process identified by the process ID "P31" is completed.

The process ID "PE" written in the route table 1222 is special identification information and corresponds to a process for ending the workflow. In the route table 1222 illustrated in FIG. 5, the start condition corresponding to the process ID "PE" is "P37 completed|P39 completed". This means that this workflow ends when the process with the process ID "P37" or the process with the process ID "P39" is completed.

In addition, in the route table 1222 illustrated in FIG. 5, the start condition for the process with the process ID "P36" is "P35 completed & C61 satisfied". This means that the process with the process ID "P36" is started when the process with the process ID "P35" is completed and when the condition indicated by the condition ID "C61" is satisfied. The condition ID herein is identification information for identifying each of various conditions when a job is processed in a workflow.

On the other hand, in the route table 1222 illustrated in FIG. 5, the start condition of the process with the process ID "P38" is "P35 completed & C61 unsatisfied". This means that the process with the process ID "P38" is started when the process with the process ID "P35" is completed and when the condition indicated by the condition ID "C61" is not satisfied. That is, the route of this workflow branches into two ways depending on whether the condition indicated by the condition ID "C61" is satisfied when the process indicated by the process ID "P35" is completed.

Figure 6:
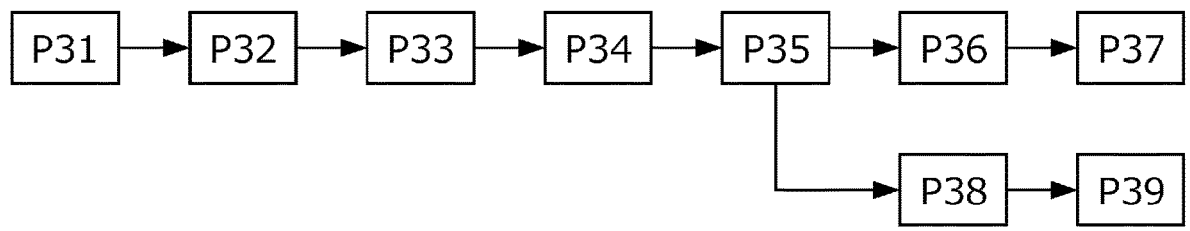
FIG. 6 illustrates an example of a route determined from the route table.

FIG. 6 illustrates an example of a route determined from the route table 1222. The route illustrated in FIG. 6 is determined by the combination of the start conditions in the route table 1222 illustrated in FIG. 5. That is, after processes P31, P32, P33, P34, and P35 have been processed in this order, this workflow branches into a case of where processes P35, P36, and P37 are processed in this order and a case where processes P35, P38, and P39 are performed in this order.

In the route table 1222 illustrated in FIG. 5, the expression information is information indicating a manner for expressing the process identified by the corresponding process ID. The expression information is, for example, information indicating the color, pattern, symbol, or the like indicating the above process and is used to help a user to recognize the process. For example, the expression information "green" means that the corresponding process is recognized by a user by the color of green. Note that the color in the expression information may alternatively be expressed by using, for example, a color code such as "#4DB56A".

In the route table 1222 illustrated in FIG. 5, the image data is image data for causing a terminal 2 to display an image representing the corresponding process. The image displayed by using the image data is, for example, a so-called icon or the like. Note that the image represented by the image data may be an illustration or the like of a person in charge of the corresponding process. In this case, the color, pattern, or the like of clothing of the person represented by the image may correspond with the color, pattern, or the like indicated by the above expression information. Thus, by the color, pattern, or the like in accordance with the expression information, a user associates the image indicating the process.

The charge condition is information indicating the condition of a user who is able to be in charge of the corresponding process. The charge condition is set by using, for example, details of the attribute information in the user DB 121.

Figure 7:
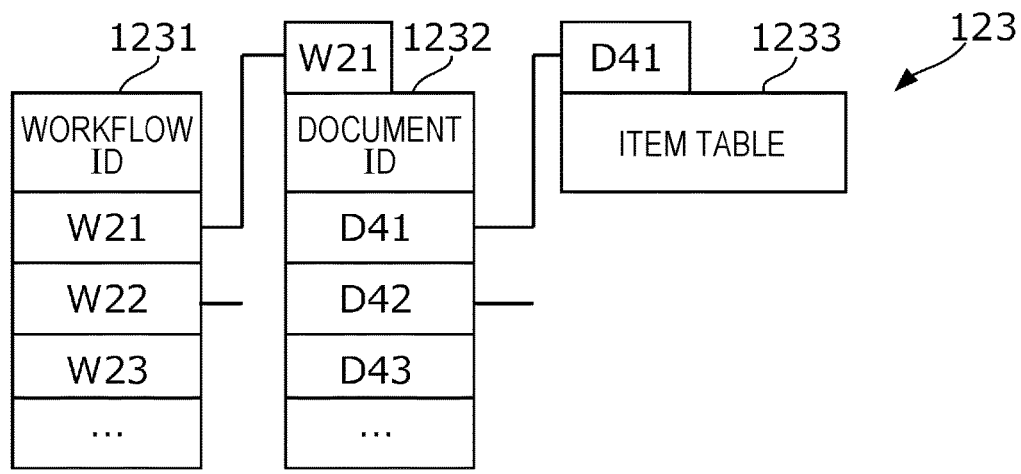
FIG. 7 illustrates an example of an item DB.

FIG. 7 illustrates an example of the item DB 123. The item DB 123 is a database that stores, for each workflow, a document to be processed in the workflow and items included in the document in association with each other. The item DB 123 includes a workflow list 1231. The workflow list 1231 is a list of workflow IDs written in the above workflow table 1221. Each of the listed workflow IDs is associated with a corresponding document list 1232 in a one-to-one relationship. The document list 1232 is a list of one or more document IDs. The document ID is identification information for identifying each document to be processed in the workflow identified by the corresponding workflow ID.

In the document list 1232, each of the listed document IDs is associated with a corresponding item table 1233 in a one-to-one relationship. FIG. 8 illustrates an example of the item table 1233. The item table 1233 is a table that stores information on items included in the document identified by the associated document ID. The item table 1233 illustrated in FIG. 8 is associated with the document ID "D41" written in the document list 1232 illustrated in FIG. 7. In addition, the document list 1232 is associated with the workflow ID "W21" written in the workflow list 1231 in the item DB 123.

The item table 1233 illustrated in FIG. 8 stores items such as an item ID, an item name, an input-allowed process ID, and request process ID, in association with one another.

In the item table 1233, the item ID is identification information for identifying one or more items included in the document identified by the document ID ("D41" in this exemplary embodiment") associated with the item table 1233. The item name is the name of the item identified by the corresponding item ID and is indicated by a symbol such as a character string.

In addition, in the item table 1233, the input-allowed process ID field is a field for listing process IDs for identifying processes in which information is allowed to be input for the item. In the item table 1233, the request process ID field is a field for listing process IDs for identifying processes in which information input for the item is necessary for processing.

For example, in the item table 1233 illustrated in FIG. 8, for the item identified by the item ID "I51", the item name is "addressee", and information is allowed to be input in the processes identified by the four process IDs "P31", "P32", "P33", and "P34". In addition, the item identified by the item ID "I51" is necessary in the process identified by the process ID "P35".

FIG. 9 illustrates an example of the condition DB 124. The condition DB 124 is a database that stores the above condition ID and condition data in association with each other. The condition data is data indicating details of the condition indicated by the condition ID. As the condition data in FIG. 9, conditions for items included in a document are written.

For example, in the condition DB 124 illustrated in FIG. 9, the condition identified by the condition ID "C61" includes "I53 . . . ". This means that this condition is a condition regarding the value of the item identified by the item ID "I53". That is, this condition is, for example, the value of "estimated total price" identified by the item ID "I53" being greater than or equal to a predetermined threshold.

Note that the condition is not limited to one regarding the value of a single item. For example, in the condition DB 124 illustrated in FIG. 9, the condition identified by the condition ID "C62" includes "I53 . . . I54 . . . ". This means that this condition is a combination of conditions regarding the values of the items identified by the item IDs "I53" and "I54". The combination of conditions is, for example, a logical sum, a logical product, or the like.

Figures 10, 11:
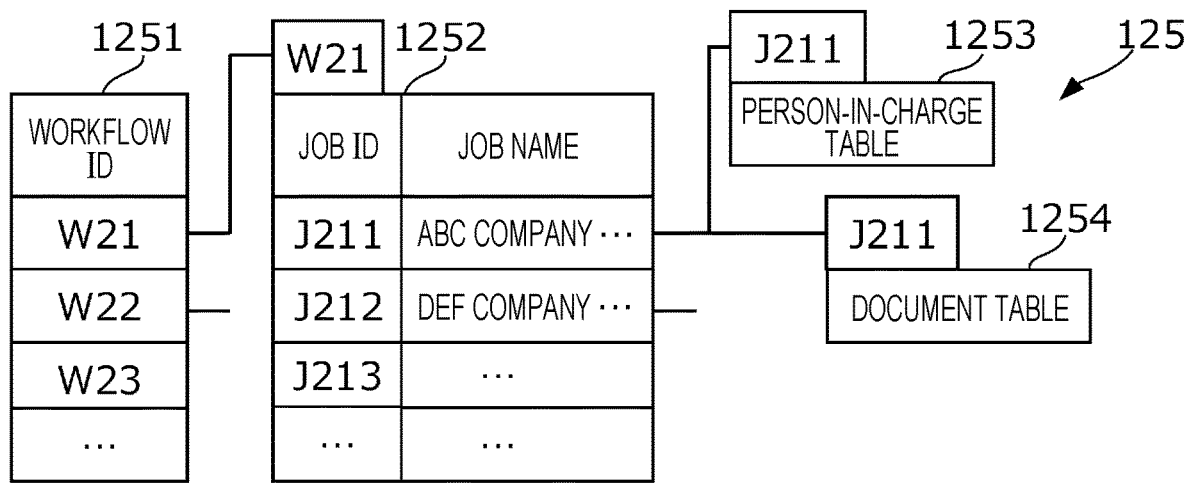
FIG. 10 illustrates an example of a job DB.
FIG. 11 illustrates an example of a person-in-charge table.

FIG. 10 illustrates an example of the job DB 125. The job DB 125 is a database that stores individual jobs registered to be done in accordance with any of the workflows treated by the information processing system 9. The job DB 125 illustrated in FIG. 10 includes a workflow list 1251, a job table 1252, a person-in-charge table 1253, and a document table 1254.

The workflow list 1251 is a list of the above workflow IDs. In the workflow list 1251, each of the listed workflow IDs is associated with the job table 1252. The job table 1252 stores a job ID, which is for identifying each job to be done in accordance with the workflow identified by the associated workflow ID, and a job name, which the name of the job, in association with each other. The job name is information for a user to grasp the job, and is indicated by, for example, a character string including a partner of the job, such as "ABC company . . . " or "DEF company . . . ", a related product, a service name, or the like.

Each of the job IDs listed in the job table 1252 is associated with the corresponding person-in-charge table 1253 and the corresponding document table 1254 in a one-to-one relationship.

FIG. 11 illustrates an example of the person-in-charge table 1253. The person-in-charge table 1253 is a table that stores persons in charge of processes for processing a document in a job identified by a corresponding job ID. The person-in-charge table 1253 illustrated in FIG. 11 illustrates details of the person-in-charge table 1253 illustrated in FIG. 10 and is associated with the job ID "J211". The person-in-charge table 1253 stores items such as a process ID, a person-in-charge ID, and a processing date and time, in association with one another.

In the person-in-charge table 1253, the process ID is identification information for identifying each process to be performed for the job identified by the job ID associated with the person-in-charge table 1253. The person-in-charge ID is identification information of a user who is in charge of the process identified by the corresponding process ID, that is, a user ID. The processing date and time is information indicating the date and time on and at which the process identified by the corresponding process ID is processed. If the process is yet to be performed, the processing date and time field is blank, for example, which indicates that the processing is unscheduled. In addition, if the job is returned, a symbol or the like indicating that the job is returned may be stored in the processing date and time field.

Figures 12, 13:
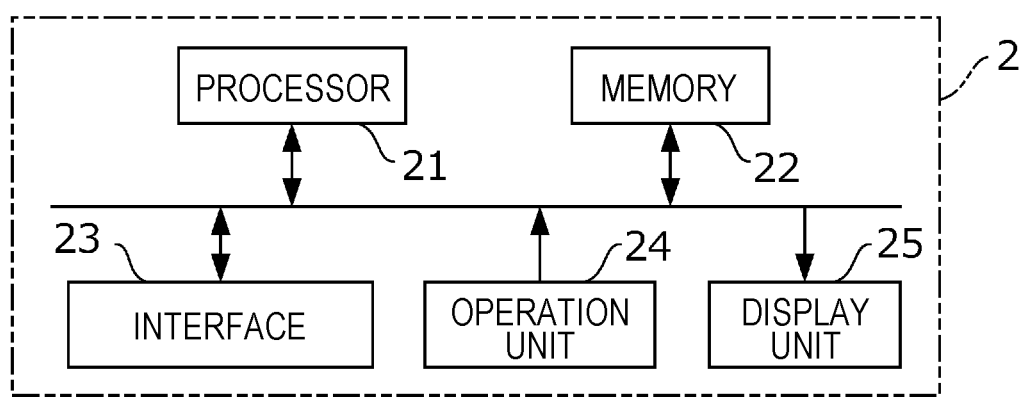
FIG. 12 illustrates an example of a document table.
FIG. 13 illustrates an example of the configuration of a terminal.

FIG. 12 illustrates an example of the document table 1254. The document table 1254 is a table that stores each document to be processed in a job identified by a corresponding job ID. The document table 1254 illustrated in FIG. 12 indicates details of the document table 1254 illustrated in FIG. 10 and is associated with the job ID "J211". The document table 1254 stores a document ID and document data in association with each other.

The document ID is identification information for identifying each of the above documents. The document data is data indicating details of the document identified by the corresponding document ID. For example, in the document table 1254 illustrated in FIG. 12, details of the document identified by the document ID "D41" are indicated by the document data "I51=" . . . ", I52= . . . ". That is, this document includes the values of the items identified by the item IDs "I51" and "I52".

Note that in a case where the information processing system 9 includes a document managing apparatus that manages a document to be processed in a workflow, the above document table 1254 may store, in place of the document data, information such as a pass or a uniform resource identifier (URI) indicating where the individual document is stored in the document managing apparatus. In this case, by using the information such as the pass or URI read from the document table 1254, the processor 11 of the information processing apparatus 1 may request the document managing apparatus, via the communication line 3, for the document stored in the place indicated by the information.

Configuration of Terminal

FIG. 13 illustrates an example of the configuration of a terminal 2. The terminal 2 illustrated in FIG. 13 includes a processor 21, a memory 22, an interface 23, an operation unit 24, and a display unit 25. These components are communicably connected to one another via a bus, for example.

The processor 21 reads and executes a program stored in the memory 22 to control the units of the terminal 2. The processor 21 is, for example, a CPU.

The interface 23 is a communication line that communicably connects the terminal 2 and the information processing apparatus 1 to each other via the communication line 3 with or without wires.

The operation unit 24 includes operators such as an operation button, a keyboard, a touch panel, and a mouse for issuing various instructions, and accepts an operation to send a signal in accordance with the operation to the processor 21.

The display unit 25 includes a display screen such as a liquid crystal display and displays an image under control of the processor 21. On the display screen, a transparent touch panel in the operation unit 24 may be superposed.

The memory 22 is a storage that stores an operating system, various programs, data, and the like to be read in the processor 21. The memory 22 includes a RAM or a ROM. Note that the memory 22 may further include a solid state drive, a hard disk drive, or the like.

Functional Configuration of Information Processing Apparatus

Figure 14:
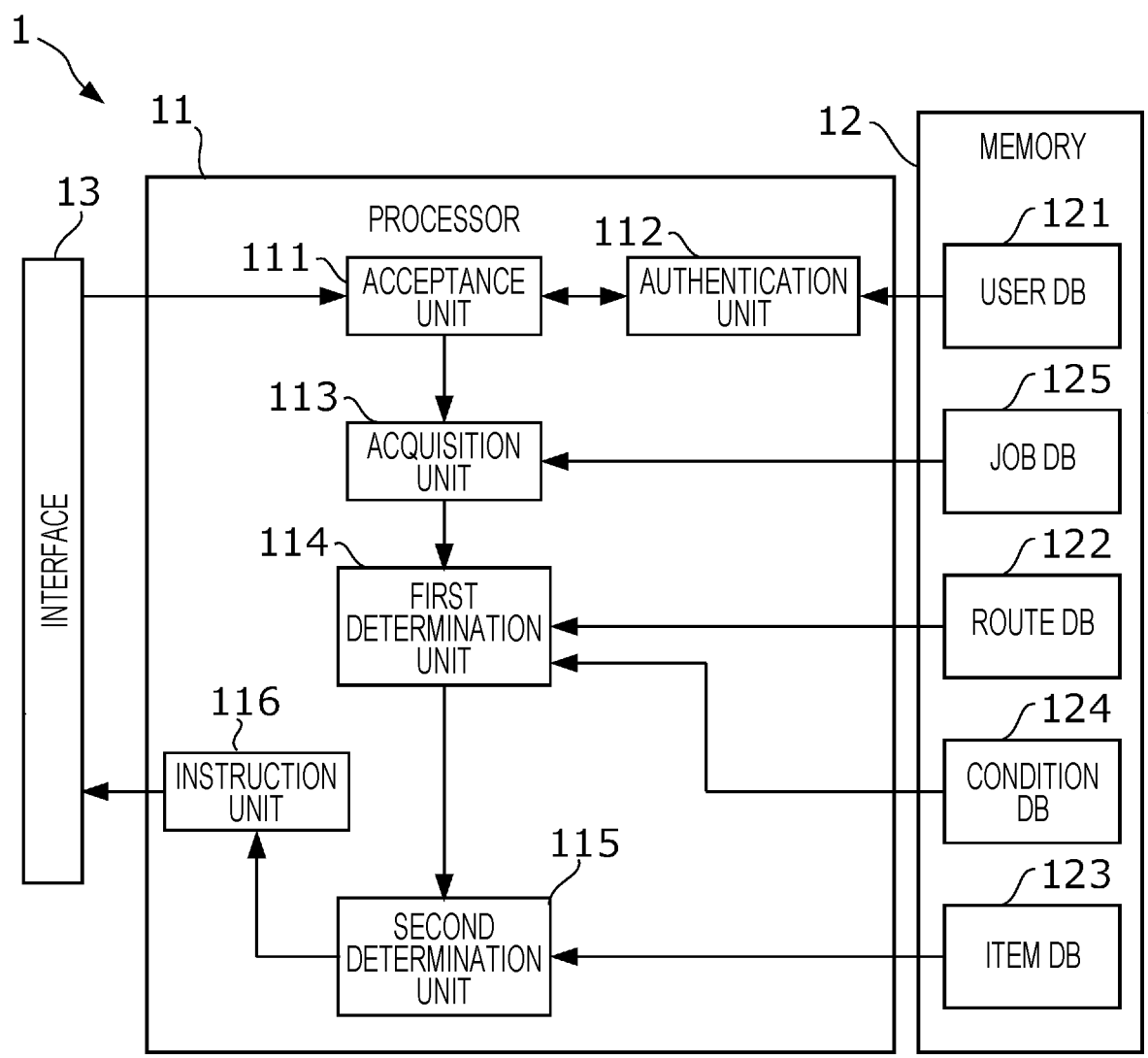
FIG. 14 illustrates an example of a functional configuration of the information processing apparatus.

FIG. 14 illustrates an example of a functional configuration of the information processing apparatus 1. By executing a program stored in the memory 12, the processor 11 of the information processing apparatus 1 functions as an acceptance unit 111, an authentication unit 112, an acquisition unit 113, a first determination unit 114, a second determination unit 115, and an instruction unit 116.

The acceptance unit 111 accepts a user operation from the terminal 2 through the interface 13. First, the acceptance unit 111 accepts authentication information that a user inputs by operating the operation unit 24 of the terminal 2. After authentication has succeeded, the acceptance unit 111 accepts an operation on the information processing apparatus 1 from the authenticated user.

Referring to the user DB 121, the authentication unit 112 performs authentication based on the authentication information accepted by the acceptance unit 111. If the authentication is successful, the authentication unit 112 informs the acceptance unit 111 that the authentication is successful.

In response to the acceptance unit 111 accepting designation of a job by the authenticated user, the acquisition unit 113 refers to the job DB 125 to acquire a document to be processed in the designated job.

The first determination unit 114 determines a route on which the document acquired by the acquisition unit 113 is to be processed in a workflow. This route is determined by referring to the route DB 122 and the condition DB 124.

The second determination unit 115 determines a final process (referred to as first process) for processing the document acquired by the acquisition unit 113 on the above route among processes in which information is allowed to be input for an item (referred to as first item) included in the document. The first process is determined by referring to the item DB 123.

That is, the second determination unit 115 extracts, from the item DB 123, the item table 1233 associated with the document ID of the document to be processed in the designated job. Subsequently, from the item table 1233, the second determination unit 115 reads an input-allowed process IDs each corresponding to the above first item and determines, as identification information of the first process, the last process ID when these IDs are arranged in accordance with the route determined by the first determination unit 114.

The instruction unit 116 instructs the terminal 2 to display the above first item in a manner in accordance with the first process determined by the second determination unit 115.

Operations of Information Processing Apparatus

Figure 15:
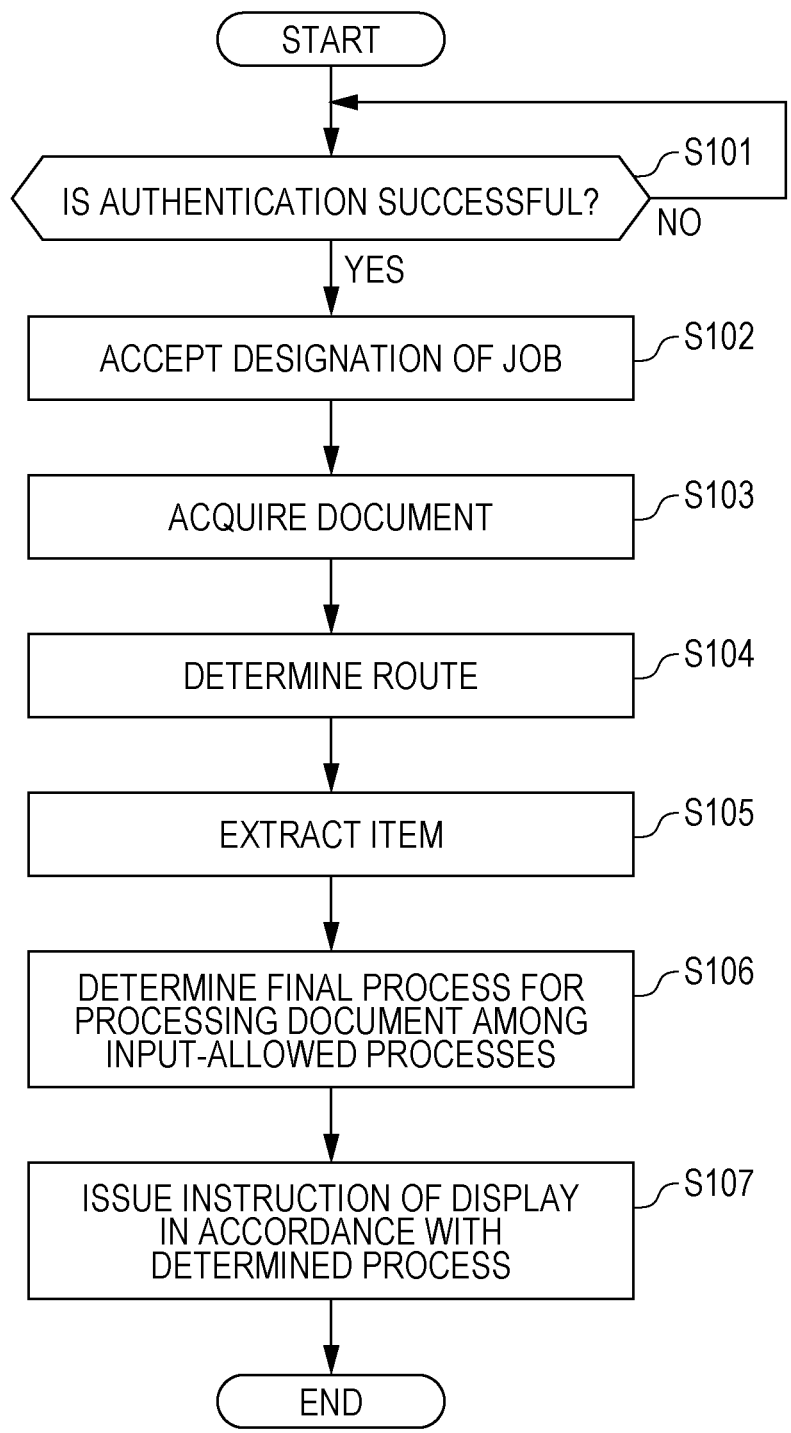
FIG. 15 is a flowchart illustrating an example of a flow of operations of the information processing apparatus.

FIG. 15 is a flowchart illustrating an example of a flow of operations of the information processing apparatus 1. The processor 11 of the information processing apparatus 1 acquires authentication information of a user from the terminal 2 through the interface 13 and performs authentication by using the user DB 121. The processor 11 determines whether the authentication is successful (step S101). While it is determined that the authentication is unsuccessful (step S101; NO), the processor 11 repeats this determination.

On the other hand, if it is determined that the authentication is successful (step S101; YES), the processor 11 accepts designation of a job by the user from the terminal 2 through the interface 13 (step S102). Upon reception of the designation, the processor 11 acquires a document to be used in the designated job (step S103) and determines a route on which the document is to be processed in a workflow (step S104).

Subsequently, the processor 11 extracts an item included in the acquired document (step S105). For example, in a case where the acquired document is represented by an image, the processor 11 may perform a character recognition processing on the image representing this document and may extract a set of an indicator (i.e., item name) of an item included in this document and the value of the item. In this case, for example, the item is extracted through character recognition processing performed on input fields divided by lines and character strings disposed in a predetermined direction with respect to the input fields, such as the left or above.

In addition, for example, in a case where the acquired document is data described in a markup language, such as Extensible Markup Language (XML), the processor 11 may perform a syntax analysis on this data by using a predetermined algorithm and may extract the above item.

Upon determining the route on which the acquired document is to be processed and extracting the item (i.e., the first item) included in the document, the processor 11 determines processes in which information is allowed to be input for the extracted item.

Subsequently, the processor 11 arranges the processes in accordance with the above route and determines the final process (i.e., the first process) for processing the document among the processes (step S106).

That is, the processor 11 is an example of a processor that acquires the document, determines the route on which the document is to be processed in the workflow, and determines the first process that is the final process for processing the document on the route among the processes in which information is allowed to be input for the first item included in the document.

Subsequently, the processor 11 instructs the terminal 2 to display the first item in a manner in accordance with the determined first process (step S107), and the process ends.

Example of Input Screen

Figures 16A, 16B:
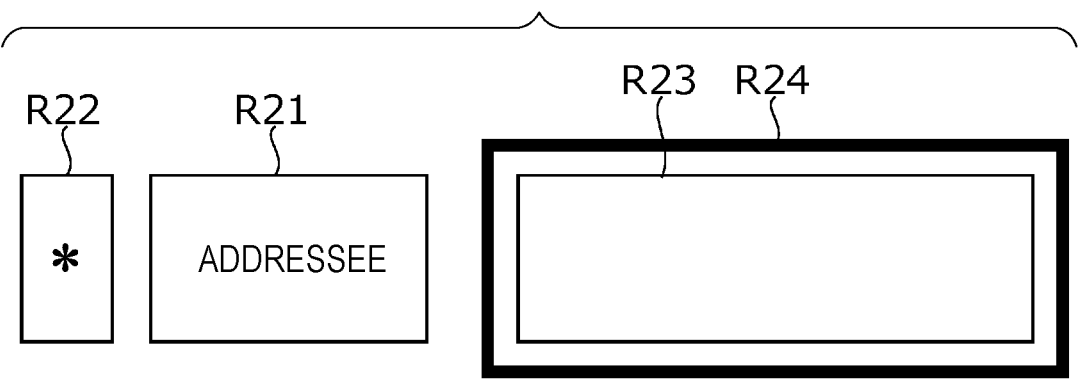
FIGS. 16A and 16B illustrate an example of an input screen of a document.

FIGS. 16A and 16B illustrate an example of an input screen of a document. Upon reception of the above instruction from the processor 11 of the information processing apparatus 1, the processor 21 of the terminal 2 causes the display unit 25 to display the input screen illustrated in FIG. 16A, for example.

On the input screen illustrated in FIG. 16A, a region R1 on the left is a region for displaying an image representing an overall image of the document. In addition, on the input screen, a region R2 on the right is a region for arranging and displaying sets of items included in the document and input fields for inputting information for the items.

For example, a form or the like printed on a physical medium, such as paper, or handwritten thereon, is read by an optical reading apparatus, such as a scanner, and the information processing apparatus 1 converts the form into image data representing the read image. The image data is stored in the job DB 125 as document data representing the document to be used in a designated job by the processor 11 of the information processing apparatus 1.

In response to a user designating a job by operating the terminal 2, the processor 11 of the information processing apparatus 1 refers to the job DB 125 to determine document data representing the document to be used for the job. The processor 11 extracts item information from the document data and provides the document data and the item information to the terminal 2. The terminal 2 displays the region R1 on the basis of the provided document data and displays the region R2 on the basis of the provided item information.

FIG. 16B illustrates details of a row displayed in the region R2 in FIG. 16A. This row includes a set of an item name included in the document and an input field and includes a region R21 indicating the item name, a region R22, a region R23 indicating the input field, and a region R24.

The region R21 is a region for displaying a character string indicating the item name. The region R22 is, for example, a region disposed on the left of the region R21 and displaying a symbol such as "*". The symbol displayed in the region R22 indicates that the value of the item in the row is necessary for the entire workflow.

For example, when "*" is displayed in the region R22, the user understands that the value of the item in this row is necessary for the entire workflow; when "*" is not displayed in the region R22, the user understands that the value is not necessary. The setting of the value of the item being necessary for the entire workflow is referred to as necessity setting.

Note that in FIG. 16A, modified "*", such as shaded "*", is displayed on the left of the item name "estimated total price". This indicates that the value of the item is necessary information but is not necessarily input in a current process.

On the other hand, non-shaded "*" displayed on the left of the item name "addressee" indicates that the value of this item is necessary information and needs to be input in the current process.

The region R23 is a region indicating an input field. For example, when the user moves a mouse cursor to the inside of the region R23 or performs an operation of tapping the inside of the region R23 displayed on a touch panel, the processor 21 of the terminal 2 activates the input field and accepts input from the user.

The region R24 is a region around the region R23 and displays the color, pattern, or the like for modifying the region R23. The terminal 2 displays, in this region R24, a color frame or the like in a manner in accordance with the first process. The first process is the final process for processing the document among processes in which information is allowed to be input for the item associated with the row including the region R24. The display manner, such as a color frame, in the region R24 is determined in accordance with the expression information written in the route table 1222 in the route DB 122.

That is, the processor 11 of the information processing apparatus 1 that instructs the terminal 2 to display the input screen illustrated in FIG. 16A is an example of a processor that displays the first item in a manner in accordance with the first process. In addition, the processor 11 that instructs the terminal 2 to display a color frame or the like in accordance with the first process in the region R24 illustrated in FIG. 16B is an example of a processor that displays the input field for inputting the information for the first item in a manner in accordance with the first process.

Note that the region R24 is provided at a position for modifying the input field indicated by the region R23, but may also be provided at a position for modifying the item name. That is, the information processing apparatus 1 may display the first item included in the document in a manner in accordance with the first process that is the final process in which information is allowed to be input for the first item.

Through the above operations, the information processing apparatus 1 of the information processing system 9 causes the terminal 2 to display the first item included in the document to be processed in the workflow in a manner in accordance with the first process that is the final process in which information is allowed to be input for the first item. Thus, the user can grasp the process in the workflow in which information is allowed to be input for the first item included in the document to be processed in the workflow. In addition, among the processes in which information is allowed to be input for the first item, the user is able to determine the first process that is the final process for processing the document on the route in the workflow and to process the document without inputting information for the first item until the first process. Thus, the information processing system 9 may increase throughput compared with a system that is incapable of advancing the process without information for a necessary item being input.

MODIFICATIONS

The exemplary embodiment has been described above. Details of the exemplary embodiment may be modified as follows. In addition, the following modifications may be combined with one another.

First Modification

In the exemplary embodiment above, the information processing apparatus 1 includes the processor 11 constituted by a CPU. However, the information processing apparatus 1 may also be controlled by another constituent. For example, the information processing apparatus 1 may include any of various processors other than the CPU.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Second Modification

In the embodiment above, the term "processor" is broad enough to encompass one processor or plural processors in collaboration which are located physically apart from each other but may work cooperatively.

The order of operations of the processor is not limited to one described in the embodiment above, and may be changed.

Third Modification

In the exemplary embodiment above, the information processing apparatus 1 may also have the functions of the terminal 2. In this case, the information processing apparatus 1 may include a component corresponding to the operation unit 24 and the display unit 25 in the terminal 2.

Fourth Modification

In the exemplary embodiment above, the processor 11 instructs the terminal 2 to display the input screen illustrated in FIG. 16A. However, another screen may also be displayed in accordance with an operation on the input screen.

For example, if a user moves a mouse cursor to the region R23 above, or performs a so-called mouseover operation, the processor 11 may accept this operation through the terminal 2 and may instruct the terminal 2 to display, in association with the first item indicated by the region R23, images representing plural processes for processing a document.

Figure 17:
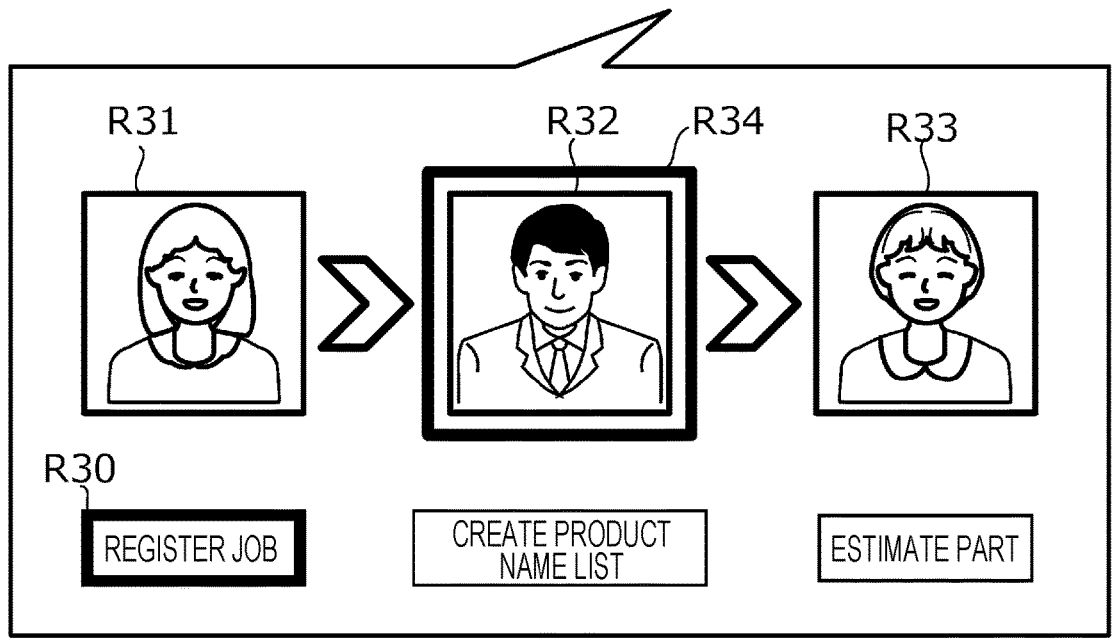
FIG. 17 illustrates an example of a screen displaying images each representing a process.

FIG. 17 illustrates an example of a screen displaying images respectively representing processes. On the input screen illustrated in FIG. 16A, if a user performs a mouseover operation on any of the input fields, the processor 11 of the information processing apparatus 1 instructs the terminal 2 to display a screen in accordance with the operation. In accordance with the instruction, as illustrated in FIG. 17, the terminal 2 displays a balloon screen with the origin on the input field on which the mouseover operation is performed. Note that this screen may be other than the balloon screen as long as the user understands that the screen corresponds to the above-described input field.

On the balloon screen illustrated in FIG. 17, a region R31, a region R32, and a region R33 are arranged and displayed in this order from the left to the right. Images are displayed in the three regions, respectively, and the images represent processes for processing the document illustrated in the region R1 in FIG. 16A. In addition, the region R31, the region R32, and the region R33 are arranged in the order for performing the processes corresponding to these regions, respectively. That is, the processor 11 causing the terminal 2 to display the balloon screen illustrated in FIG. 17 is an example of a processor that arranges images respectively representing processes for processing the document in an order of the processes in accordance with the route and displays the images in association with the first item.

Note that a region R30 and a region R34 are further displayed on the balloon screen illustrated in FIG. 17. The region R30 is a region for displaying a frame indicating a current process among the processes indicated by the region R31, the region R32, and the region R33. Below the region R31, the region R32, and the region R33, respectively, "register job", "create product name list", and "estimate part" are displayed, which are character strings indicating process names corresponding to these regions. On this balloon screen, a process name indicating the current process among these process names is distinguished from the other processes by being given the frame illustrated in the region R30.

In addition, the region R34 is a region for displaying a frame to be added to an image representing the first process corresponding to the first item among plural processes for processing the document. The processor 11 determines the first item indicated by the input field on which a mouseover operation is performed and determines the first process that is the final process in which information is allowed to be input for the first item. Subsequently, the processor 11 instructs the terminal 2 to display the determined first process so as to be distinguished from the other processes. Thus, for example, in a case illustrated in FIG. 17, the terminal 2 displays a frame in the region R34 around the region R32 to inform a user that the process indicated by the region R32 is the first process.

That is, the processor 11 in this case is an example of a processor that displays an image corresponding to the first process to be distinguished from the other images among the images displayed on the above balloon screen or the like.

Fifth Modification

In the exemplary embodiment above, the processor 11 treats all items included in a document as the first item. However, the processor 11 may treat an item designated by a user as the first item. For example, if a user performs a mouseover operation on any of the input fields on the above input screen, or clicks or taps any of the input fields, to designate an item indicated by the input field, the processor 11 of the information processing apparatus 1 may accept this operation (referred to as first operation) and may determine the first process corresponding to the first item designated by the first operation.

That is, the processor 11 in this case is an example of a processor that accepts the first operation for designating the first item among items included in the document and determines the first process that is the final process for processing the document on the route for processing the document among processes in which information is allowed to be input for the first item designated by the first operation. Thus, the user performing the first operation is able to obtain, as the response, information on the first process corresponding to the first item designated by the first operation.

Sixth Modification

In addition, in a case where no information is input for the above first item, the processor 11 may instruct the terminal 2 to display the first item in a manner in accordance with the corresponding first process. Note that the case where no information is input for the item includes a case where information has never been input for the item and a case where, for example, a reserved word indicating that the information is undecided is input.

The processor 11 in this case is an example of a processor that, in a case where no information is input for the first item, displays the first item in a manner in accordance with the first process corresponding to the first item. Thus, a user is able to recognize the first item displayed in a manner in accordance with the corresponding first process as an item for which no information is input.

Seventh Modification

In the above modification, the region R30 and the region R34 are different regions. However, the region R34 may also serve as the region R30. The region R34 in this case is a region for displaying a frame to be added to an image representing the first process corresponding to the first item among plural processes for processing the document and also displaying this frame in a manner in a case where the first process is the current process, the manner being different from that in other cases.

For example, in a case where the image displayed in the region R32 is an image representing the first process corresponding to the first item, the processor 11 causes the terminal 2 to display a frame in the region R34 around this image. In addition, for example, in a case where the first process is the current process, the processor 11 causes the frame displayed in the region R34 to blink; in a case where the first process is not the current process, the processor 11 does not cause the frame to blink. That is, the processor 11 is an example of a processor that, in a case where a process in which the document is being processed is the first process, displays the first item in a manner different from that in other processes.

Eighth Modification

In the above modification, the processor 11 displays the first item in a manner in a case where the first process corresponding to the first item is the current process, the manner being different from that in other cases. However, the processor 11 may change the display manner depending on whether information for an item included in a document is necessary for a current process. Furthermore, the processor 11 may accept a return instruction from a user if information necessary for a current process is not input.

Figure 18:
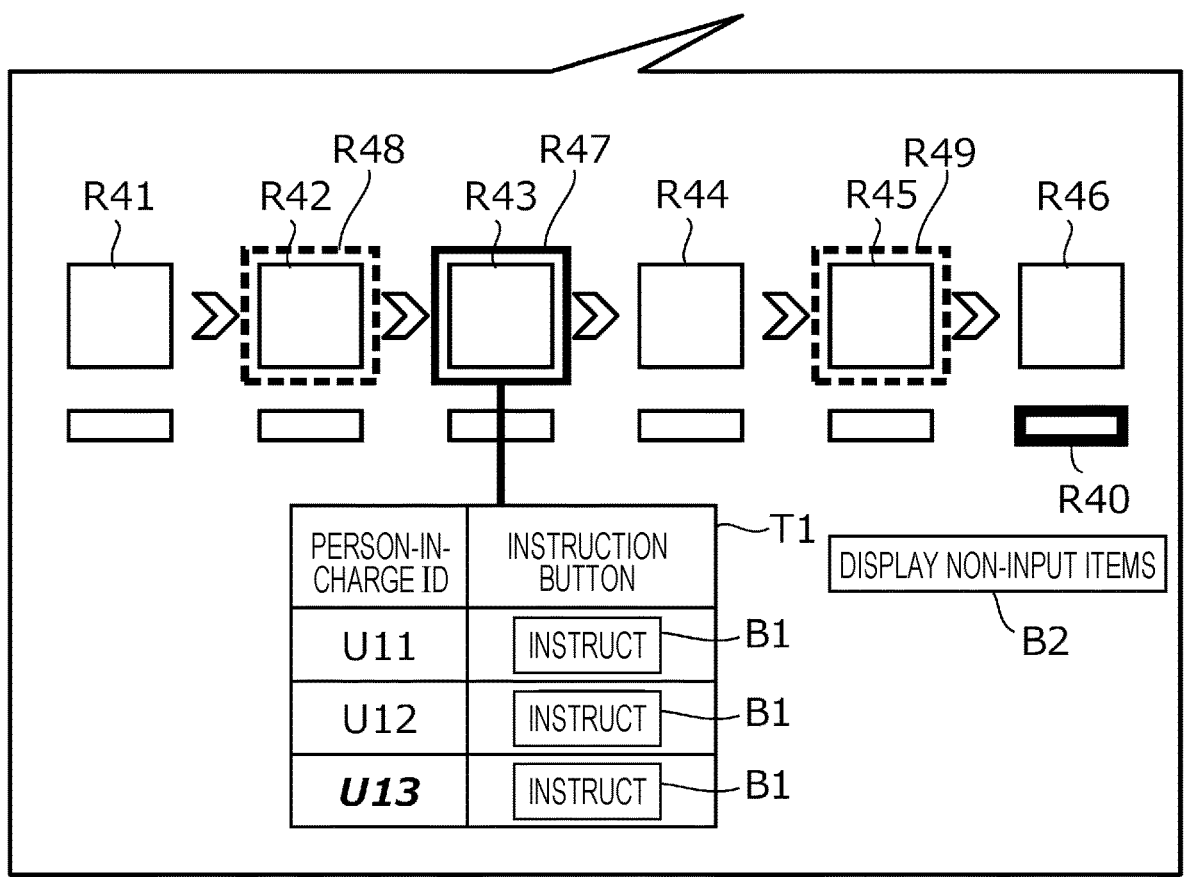
FIG. 18 illustrates an example of a screen for accepting a return instruction.

FIG. 18 illustrates an example of a screen for accepting a return instruction. For example, if a user performs a mouseover operation on the region R23 illustrated in FIG. 16, the processor 11 causes the terminal 2 to display the balloon screen illustrated in FIG. 18 in association with the item indicated by the region R23. On the balloon screen illustrated in FIG. 18, a region R41, a region R42, a region R43, a region R44, a region R45, and a region R46 are arranged and displayed in this order from the left to the right. In these six regions, plural images respectively representing processes for processing a document are displayed. In addition, a region R40 illustrated in FIG. 18 is a region for displaying a frame indicating a current process.

The region R40 in FIG. 18 is displayed below the region R46. This indicates that the process corresponding to the region R46 is the current process.

On the other hand, a region R47 illustrated in FIG. 18 is a region around the region R43, and a frame is displayed therein. This frame indicates a final process among processes in which information is allowed to be input for the item indicated by the region R23 designated by the above mouseover operation. In addition, the region R43 is disposed on the left of the region R46. This means that the process corresponding to the region R43 is performed prior to the process corresponding to the region R46 (i.e., the current process).

When causing the terminal 2 to display the balloon screen illustrated in FIG. 18, the processor 11 determines an item (referred to as second item) indicated by the region R23 designated by the mouseover operation and determines whether the current process is a process (referred to as second process) for which information for the second item is necessary.

In this case, the processor 11 may refer to the request process ID in the above item DB 123, determine processes for which the information for the second item indicated by the designated region is necessary, and determine whether the current process is included in the determined processes.

If it is determined that the current process is the second process, the processor 11 determines a final process among processes in which information is allowed to be input for the second item. Subsequently, the processor 11 instructs the terminal 2 to display the above frame around the image representing the determined process on the balloon screen illustrated in FIG. 18 and to display a selection table T1 linked to the frame.

The selection table T1 lists pieces of identification information of users who are able to be in charge of the process emphasized by the above frame on the basis of the charge condition written in the route DB 122 and accepts a user instruction for selecting any of the pieces of identification information. In the selection table T1, person-in-charge IDs are displayed in the left field, and instruction buttons B1 are displayed in the right field.

Note that among the person-in-charge IDs displayed in the selection table T1 in the example illustrated in FIG. 18, "U13" is displayed in a font (italics and bold) different from that for "U11" and "U12". This means that "U13" is a final person in charge who has processed the document in the processes in which information is allowed to be input for the second item.

That is, in this case, the processor 11 is an example of a processor that displays a final person who has processed the above document to be distinguished from another person among persons in charge of the processes in which information is allowed to be input for the second item. Thus, a user is able to distinguish, from the other person in charge, the person in charge who has processed the document without inputting information for the second item although they have given the final opportunity to input information for the second item.

The user checks the person-in-charge IDs listed in the left field of the selection table T1 and determines a person to be in charge of a process to which the document is to be returned. Subsequently, the user selects the instruction button B1 corresponding to the person in charge from the right field of the selection table T1 and presses the instruction button B1.

The processor 11 accepts the pressing operation through the terminal 2. Subsequently, the processor 11 returns the document to the process emphasized by the above frame and notifies the person in charge, corresponding to the instruction button B1, of a message indicating that the document is returned. That is, the processor 11 accepts, from the user, an instruction for returning the job from the above selection table T1. The person in charge notified of the above message inputs information for the second item included in the returned document. At this time, the processor 11 may instruct the terminal 2 to display an input screen not including items other than the second item.

Note that, in the example illustrated in FIG. 18, the processor 11 determines the final process among the processes in which information is allowed to be input for the second item. However, for example, the processor 11 may determine all the processes in which information is allowed to be input for the second item. In this case, by using the balloon screen illustrated in FIG. 18, the processor 11 may allow the user to select any of all the above second processes.

That is, the processor 11 in this case is an example of a processor that, in a case where a process in which the document is being processed is the second process for which information for the second item included in the document is necessary and where the information is not input for the second item, accepts an instruction for selecting any of the processes in which information is allowed to be input for the second item and returning the document to the selected process.

In addition, in the above example, the user not only designates the process to which the document is to be returned, but also designates the person to be in charge of this process. Thus, the processor 11 in this case is an example of a processor that, in a case where the process in which the document is being processed is the second process and where the information is not input for the second item, accepts an instruction for selecting any of at least one person to be in charge of a process in which information is allowed to be input for the second item and returning the document. With the above configuration, the person who the user wishes to be in charge of inputting information for the second item becomes obvious.

Note that the processor 11 may also accept a user instruction for returning the document to the second process without designation of the person to be in charge. In this case, the processor 11 may notify all users who are able to be in charge of the second process that the return instruction is issued. In addition, also in a case where a return instruction is issued with the person to be in charge designated, the processor 11 may notify all users who are able to be in charge of the second process that the return instruction is issued. Thus, even when the designated person to be in charge is on vacation or away from their seat, for example, and does not notice the return instruction, another user who is able to be in charge may advance the process by proxy.

In addition, the screen in the above example is displayed in a case where the processor 11 determines that the current process is the second process, and the balloon screen illustrated in FIG. 18 is not displayed in a case where the processor 11 determines that the current process is not the second process. That is, in a case where the item indicated by the region designated by a mouseover operation or the like is an item that is not necessary for the current process, the processor 11 does not accept a return instruction. The processor 11 in this case is an example of a processor that, in a case where the process in which the document is being processed is a process for which the information for the second item is not necessary, does not accept the instruction for selecting any of the processes in which information is allowed to be input for the second item and returning the document to the selected process.

In addition, in a case where information necessary for the current process is not input for an item in addition to the second item indicated by the designated region, the processor 11 may determine a process(es) in which the information is allowed to be input for such an item and may emphasize the region(s) for displaying the image(s) representing the process(es) in a manner different from the above frame or the like.

A region R48 and a region R49 illustrated in FIG. 18 are regions respectively emphasizing the region R42 and the region R45 with a frame different from the frame displayed in the region R47. Thus, a user understands that processes represented by images displayed in the region R42 and the region R45 do not correspond to the items designated by the second operation but correspond to items for which information necessary for the current process is not input. That is, the user understands each process to which the document is to be returned where information is to be input for, not only the single second item designated by the second operation, but also all items, the information being necessary for the current process.

Ninth Modification

In the exemplary embodiment or modifications above, the processor 11 determines a process corresponding to an item indicated by a region designated by the first operation, such as a mouseover operation. However, the processor 11 may also accept an operation (referred to as second operation) for collectively designating at least one item (referred to as non-input item) for which information is not input among one or more items included in a document.

For example, on the balloon screen illustrated in FIG. 18, a button B2 labeled as the character string "display non-input items" is displayed. The button B2 is a button for accepting an instruction for displaying a list of information about the above non-input items (i.e., "display non-input items").

Figure 19A:
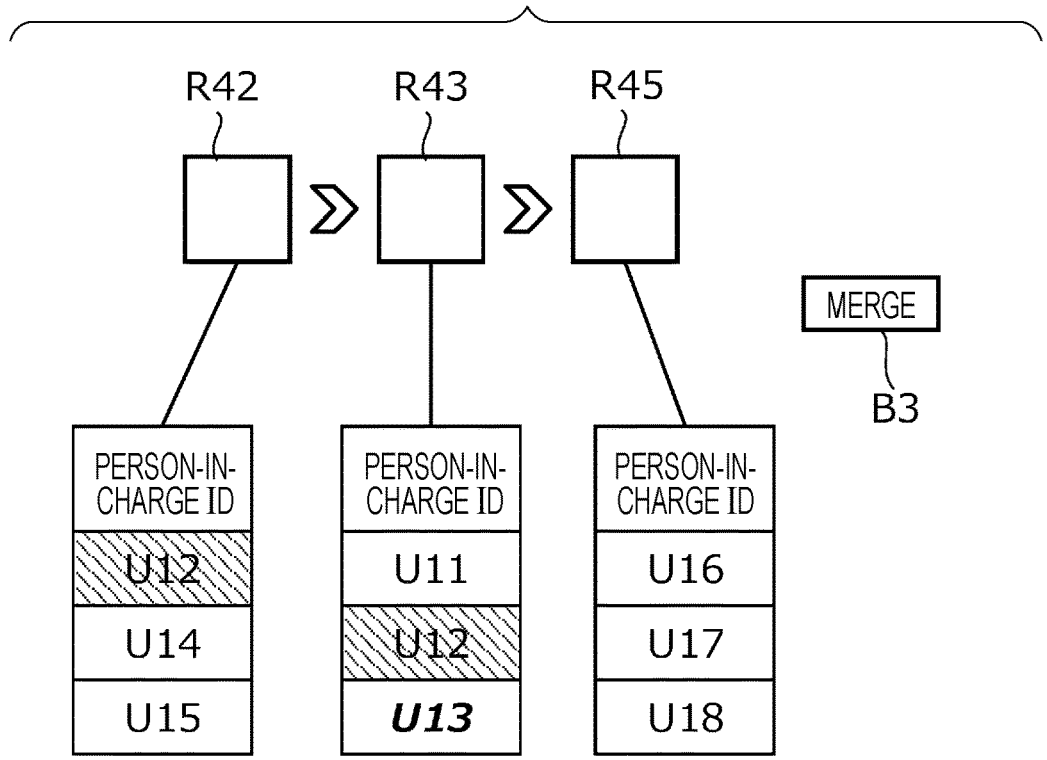
FIGS. 19A and 19B illustrate examples of screens for displaying non-input items.
Figure 19B:
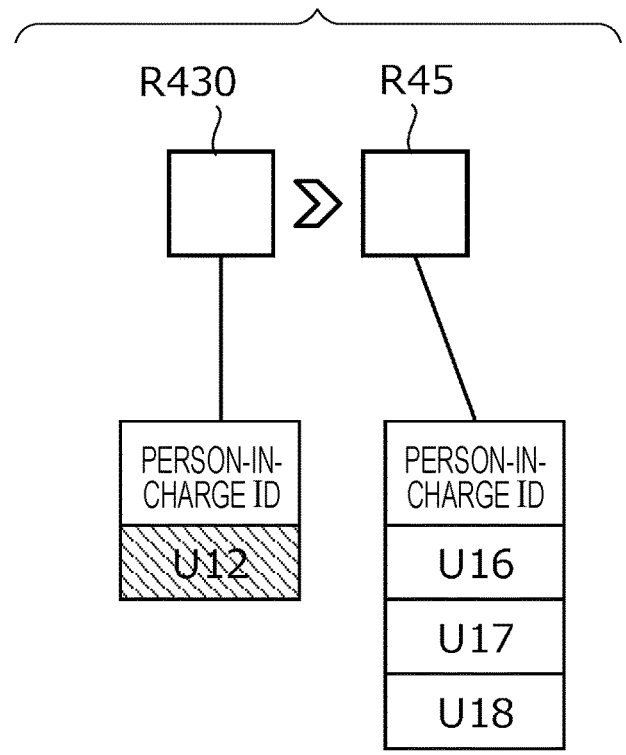

FIGS. 19A and 19B illustrate examples of screens for displaying the non-input items. If a user performs a second operation for pressing the button B2 on the balloon screen illustrated in FIG. 18, the processor 11 instructs the terminal 2 to display the screen for displaying the non-input items illustrated in FIG. 19A. The screen for displaying the non-input items is displayed by the processor 11 determining, for each of the non-input items, the first process that is a final process among processes in which information is allowed to be input on the route in the workflow, and instructing the terminal 2 to display each of the non-input items in a manner in accordance with the first process.

As illustrated in FIG. 19A, the screen for displaying the non-input items includes the region R42, the region R43, and the region R45. These three regions are regions for displaying images respectively representing processes corresponding to all items for each of which information necessary for the current process is not input in FIG. 18. In addition, for each of these three regions, a list (referred to as person-in-charge list) of persons who are able to be in charge of the process represented by the image displayed in the region is displayed.

That is, the processor 11 in this case is an example of a processor that accepts a second operation for designating at least one non-input item for which information is not input among one or more items included in the document, determines, upon accepting the second operation, for each of the at least one non-input item, the first process that is the final process for processing the document on the route in the workflow among processes in which information is allowed to be input for the at least one non-input item, and displays each of the at least one non-input item in a manner in accordance with the determined first process.

By viewing this screen for displaying the non-input items, a user is able to understand each process to which the document is to be returned where information is to be input for all items, the information being necessary for the current process. In addition, by the person-in-charge list linked to each process to which the document is to be returned, the user is able to know persons who are able to be in charge of the processes to which the document is to be returned.

Furthermore, on the screen for displaying the non-input items illustrated in FIG. 19A, a button B3 labeled as the character string "merge" is displayed. The button B3 is displayed in an available state in a case where a person (referred to as common person-in-charge) is able to be in charge of successive processes among the processes respectively represented by the images displayed in the regions on the screen for displaying the non-input items.

For example, on the screen for displaying the non-input items illustrated in FIG. 19A, the region R42 and the region R43 are regions for displaying the images respectively representing successive processes. Person-in-charge lists linked to these regions include "U12" as a common user ID. This means that the user identified by the user ID "U12" is a common person-in-charge who is able to be in charge of the two successive processes represented by the images displayed in the region R42 and the region R43.

If the user presses the button B3, the processor 11 accepts this process and integrates the region R42 and the region R43 to display a new region R430 on the screen for displaying the non-input items as illustrated in FIG. 19B. The region R430 is a region for displaying an image representing, as a single process, the two processes corresponding to the region R42 and the region R43 illustrated in FIG. 19A. In addition, a person-in-charge list listing the above common person-in-charge is linked to the region R430. The user may select a person-in-charge ID from the person-in-charge list linked to the region R430 to return the document to a process that is newly integrated as a single process, with the common person-in-charge designated.

That is, the processor 11 in this case is an example of a processor that, in a case where the second item includes two or more second items and where at least one person is to be in charge of successive processes in which input for the two or more second items in the document on the route, accepts an instruction for selecting the at least one person and returning the document.

Tenth Modification

In the above modifications, the processor 11 refers to the request process ID in the item DB 123 to determine whether the current process in which the document is being processed is a process for which information for the second item indicated by the designated region is necessary. However, the request process ID may change depending on a progress status for processing a job. For example, the request process ID stored in the item table 1233 in the item DB 123 may change depending on information input for one or more items included in a document.

In this case, the item table 1233 in the item DB 123 may indicate a condition ID or the like in the field of the request process ID to express that a process for which information for a corresponding item is necessary changes depending on information input for any of items. This indicates that the information input for a certain item included in the document is necessary for different processes depending on whether any of items (not limited to the above item) included in the document satisfies or does not satisfy a predetermined condition.

For example, the information processing apparatus 1 may implement a workflow that requires approval of three users and advances processes if approval of two of them is obtained. In this case, the processor 11 may cause the route to branch into three ways to let the three users perform the approval processes concurrently. At this time, the processor 11 may check the items indicating the approval of the three users included in the document and determine, at the time the approval of two users out of the three users is obtained, that the approval of the last one user is unnecessary.

The processor 11 in this case is an example of a processor that determines whether the process in which the document is being processed is a process for which the information for the second item is necessary based on information input for any of one or more items included in the document.

Eleventh Modification

In the exemplary embodiment above, the route in the workflow may branch depending on whether a predetermined condition is satisfied in any of the processes. Specific examples of the condition will be described below.

Figures 20, 21:
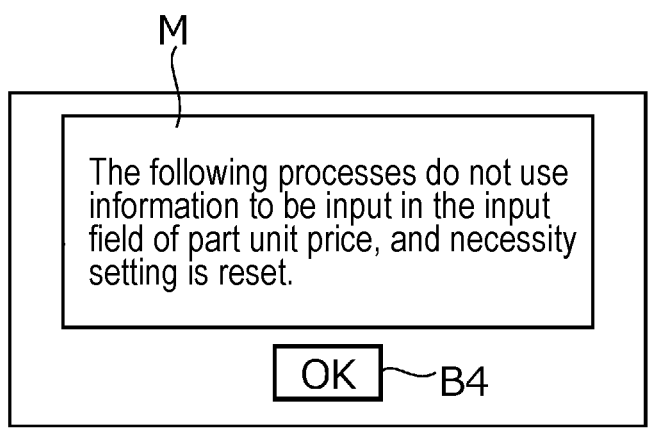
FIG. 20 illustrates an example of an input screen displayed when the route branches.
FIG. 21 illustrates an example of a message indicating that an input field is no longer necessary.

FIG. 20 illustrates an example of an input screen displayed when the route branches. The input screen illustrated in FIG. 20 includes a region R51, a region R52, and a region R53. The region R51 is a region indicating an input field of the item indicated by the item name "estimated total price". On the input screen illustrated in FIG. 20, "99,000" is input in the input field. The region R52 is an input field of the item indicated by the item name "part unit price", and the region R53 is a region around the region R52.

The condition DB 124 illustrated in FIG. 9 stores the following condition as the condition identified by the condition ID "C61": the value input for the item with the item ID "I53" is greater than or equal to 100,000.

In this case, since the item name corresponding to the item ID "I53" is "estimated total price" and the value "99,000" input on the input screen illustrated in FIG. 20 is not "greater than or equal to 100,000", the condition identified by the condition ID "C61" is not satisfied. Thus, if the value illustrated in FIG. 20 is input for the item corresponding to the process with the process ID "P35", the document is not transferred to the process identified by the process ID "P36" but is transferred to the process identified by the process ID "P38".

At this time, according to the route illustrated in FIG. 6, the workflow does not proceed to the processes identified by the process IDs "P36" and "P37". Thus, the value for the item identified by the item ID "I54" illustrated in association with the request process IDs "P36" and "P37" is no longer necessary. The processor 11 determines this and, as illustrated in FIG. 20, causes the terminal 2 to display a frame in a predetermined color, such as black, for example, in the region R53. The black frame indicates that it is no longer necessary to input information in the input field surrounded by this frame.

That is, since the region R52 is the input field of the item indicated by the item name "part unit price" and the item ID for identifying this item is "I54", the processor 11 causes the terminal 2 to display the above black frame in the region R53 around the region R52 to inform a user that the input field is no longer necessary.

At this time, the processor 11 may further instruct the terminal 2 to display a message indicating that the input field emphasized by the black frame is no longer necessary. FIG. 21 illustrates an example of the message indicating that the input field is no longer necessary. Upon reception of the above instruction from the processor 11, the terminal 2 causes the display unit 25 to display a message M illustrated in FIG. 21. The message M includes the character string "The following processes do not use information to be input in the input field of part unit price, and necessity setting is reset."

The processor 11 in this case is an example of a processor that determines the route based on information input for any of one or more items included in the document. A user checks the message M and presses a button B4 labeled as the character string "OK" to close the message M. Thus, the user is able to know, since the route branches based on the information input for any of items included in the document, the item for which the input information is no longer necessary.

Twelfth Modification

In the exemplary embodiment above, the information processing system 9 includes the single information processing apparatus 1. However, the information processing system 9 may alternatively include plural information processing apparatuses 1 that are communicably connected to each other and may implement a cluster system in which functions are shared therebetween.

In this case, the information processing system 9 is an example of an information processing system including plural information processing apparatuses that are communicably connected to each other, in which any of the plural information processing apparatuses acquires the document, determines the route on which the document is to be processed in the workflow, determines the first process that is the final process for processing the document on the determined route among the processes in which information is allowed to be input for the first item included in the document, and displays the first item in a manner in accordance with the first process.

Thirteenth Modification

In the exemplary embodiment above, a program executed by the processor 11 of the information processing apparatus 1 is an example of a program causing a computer including a processor to execute a process including: acquiring a document; determining a route on which the document is to be processed in a workflow; determining a first process that is a final process for processing the document on the route among processes in which information is allowed to be input for a first item included in the document; and displaying the first item in a manner in accordance with the first process.

This program may be provided by being stored in a computer readable storage medium such as a magnetic storage medium, an optical storage medium, a magneto-optical storage medium, or a semiconductor memory. The magnetic storage medium may be a magnetic tape, a magnetic disk, or the like. The optical storage medium may be an optical disk. Alternatively, this program may be downloaded via a communication line such as the Internet.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to
      acquire a document;
      determine a route on which the document is to be processed in a workflow;
      arrange a plurality of images respectively representing processes for processing the document in an order of the processes in accordance with the route;
      display the plurality of images in the order;
      accept an operation for designating an input field, among a plurality of input fields, for inputting the information for a first item included in the document;
      determine a first process that is a final process for processing the document on the route among processes in which information is allowed to be input for the first item included in the document; and
      display an image corresponding to the first process in a manner distinguishable from others of the plurality of images.

2. The information processing apparatus according to claim 1,
   wherein the processor is configured to accept a first operation for designating the first item among items included in the document and determine the first process that is the final process for processing the document on the route among processes in which information is allowed to be input for the first item designated by the first operation.

3. The information processing apparatus according to claim 1,
   wherein the processor is configured to
      accept a second operation for designating at least one non-input item for which information is not input among one or more items included in the document,
      determine, upon accepting the second operation, for each of the at least one non-input item, the first process that is the final process for processing the document on the route among processes in which information is allowed to be input for the at least one non-input item, and display each of the at least one non-input item in a manner in accordance with the determined first process.

4. The information processing apparatus according to claim 1, wherein the processor is configured to, in a case where no information is input for the first item, display the first item in the manner.

5. The information processing apparatus according to claim 1, wherein the processor is configured to, in a case where a process in which the document is being processed is the first process, display the first item in a manner different from that in other processes.

6. The information processing apparatus according to claim 1, wherein the processor is configured to, in a case where a process in which the document is being processed is a second process for which information for at least one second item included in the document is necessary and where the information is not input for the at least one second item, accept an instruction for selecting any of processes in which information is allowed to be input for the at least one second item and returning the document to the selected process.

7. The information processing apparatus according to claim 6, wherein the processor is configured to, in a case where the process in which the document is being processed is the second process and where the information is not input for the at least one second item, accept an instruction for selecting any of at least one person to be in charge of a process in which information is allowed to be input for the at least one second item and returning the document.

8. The information processing apparatus according to claim 7, wherein the processor is configured to, in a case where the at least one second item includes two or more second items and where at least one person is to be in charge of successive processes in which input for the two or more second items in the document on the route, accept an instruction for selecting the at least one person and returning the document.

9. The information processing apparatus according to claim 7, wherein the processor is configured to display a final person who has processed the document to be distinguished from another person among persons in charge of the processes in which information is allowed to be input for the at least one second item.

10. The information processing apparatus according to claim 1, wherein the processor is configured to, in a case where the process in which the document is being processed is a process for which the information for the at least one second item is not necessary, not accept an instruction for selecting any of the processes in which information is allowed to be input for the at least one second item and returning the document to the selected process.

11. The information processing apparatus according to claim 6, wherein the processor is configured to determine whether the process in which the document is being processed is a process for which the information for the at least one second item is necessary based on information input for any of one or more items included in the document.

12. The information processing apparatus according to claim 1, wherein the processor is configured to determine the route based on information input for any of one or more items included in the document.

13. A non-transitory computer readable medium storing a program causing a computer including a processor to execute a process for information processing, the process comprising:

acquiring a document;

determining a route on which the document is to be processed in a workflow;

arranging a plurality of images respectively representing processes for processing the document in an order of the processes in accordance with the route;

displaying the plurality of images in the order;

accepting an operation for designating an input field, among a plurality of input fields, for inputting the information for a first item included in the document;

determining a first process that is a final process for processing the document on the route among processes in which information is allowed to be input for the first item included in the document; and displaying an image corresponding to the first process in a manner distinguishable from others of the plurality of images.

* * * * *